(12) United States Patent
Penninger et al.

(10) Patent No.: US 6,343,469 B1
(45) Date of Patent: Feb. 5, 2002

(54) HYDRAULIC SYSTEM REGULATOR FOR A BRAKE AND STEERING SYSTEM

(75) Inventors: William John Penninger; John Edmund Mackiewicz, both of Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/669,324

(22) Filed: Sep. 25, 2000

(51) Int. Cl.$^7$ ................................................. F16D 31/02
(52) U.S. Cl. ........................................... 60/422; 91/516
(58) Field of Search ........................... 60/422, 416, 417; 91/516

(56) References Cited

U.S. PATENT DOCUMENTS

| | | | | |
|---|---|---|---|---|
| 3,633,363 A | * | 1/1972 | Larsen | 60/422 |
| 3,877,227 A | * | 4/1975 | Demido | 60/548 |
| 3,978,667 A | * | 9/1976 | Ohara | 60/403 |
| 4,052,851 A | * | 10/1977 | Brown | 60/416 |
| 4,217,758 A | * | 8/1980 | Bach et al. | 60/404 |
| 4,281,585 A | * | 8/1981 | Runkle et al. | 91/5 |
| 4,835,967 A | * | 6/1989 | Nomura | 60/404 |

* cited by examiner

Primary Examiner—Edward K. Look
Assistant Examiner—Igor Kershteyn
(74) Attorney, Agent, or Firm—Leo H. McCormick, Jr.; Warren Comstock

(57) ABSTRACT

A hydraulic system (10) having a pump (12) for sequentially supplying a brake booster (14) and a steering gear (16) with hydraulic fluid to an assist in effecting a brake application and/or a steering application. The brake booster (14) has a housing (100) with a chamber (102) therein connected to a first bore (104) which retains a piston (108) connected to a master cylinder (112) and a second bore (106) which retains a control valve (114). The second bore (106) has an inlet port (118) connected to the pump (12) for receiving supply hydraulic fluid, an outlet port (120) connected to the steering gear (16) and a return port (120) connected to the pump (12). Linkage (144) responsive to an input member (152) moves the control valve (114) to initially terminate communication from the second bore (106) to the return port (120) and direct the flow of a first portion of the supply hydraulic fluid to the chamber (102) to effect a brake application while a second portion thereof is communicated to the steering gear (16). A regulator (24) is connected to the pump (12) for receiving and directing the flow of supply hydraulic fluid to the inlet port (118) of the housing (100) of the booster (14). The regulator (24) responds to a preset hydraulic fluid pressure in the first portion of the supply hydraulic fluid by metering the flow of the supply pressurized hydraulic fluid to the inlet port (118) of the brake booster and thereafter directly communicating a corresponding portion of the supply hydraulic fluid through a port (210) to the steering gear (16). The regulator (24) on metering the supply hydraulic fluid to the inlet port (118) establishing a maximum limit for the hydraulic pressure in that portion of the supply hydraulic fluid presented to the control chamber (102) and to a chamber (182) in an associated accumulator (40).

10 Claims, 2 Drawing Sheets

HYDRAULIC SYSTEM REGULATOR FOR A BRAKE AND STEERING SYSTEM

This invention relates to a pressure regulator for restricting hydraulic fluid supplied to a brake system while allowing corresponding substantially unrestricted hydraulic fluid to be supplied to a steering system.

BACKGROUND OF THE INVENTION

U.S. Pat. Nos. 4,281,585 and 4,362,086 discloses a typical hydraulic brake booster which uses hydraulic fluid generated by a pump in a steering system as a source of power to effect a brake application in response to an operator input. In such brake boosters, a control valve is moved to restrict the flow of fluid from the pump to the steering gear and direct such restricted flow into a control chamber to act on a piston which supplies a master cylinder with a force to effect a brake application. In response to a maximum input force applied by an operator it is possible to nearly interrupt hydraulic flow communication to the steering gear and as a result a power assist in turning the wheels of a vehicle is correspondingly reduced. Further in brake boosters, it is common to have the control chamber connected to an accumulator so that in a situation where the pump is inoperative, a limited amount of pressurized fluid is available to effect a brake application. The accumulator is connected to the hydraulic source and during normal operation of the pump is charged to a same level as the hydraulic fluid supplied to the brake booster. In some vehicles when the engine is operating at a low level of revolution per minute such as when parking, the output of the pump does not offer sufficient power to operate the steering gear in a desired manner. A solution to improve the power assist for the steering gear is to increase the hydraulic pressure available to the steering gear. Unfortunately an increase in fluid pressure in the system may have an adverse effect on the brake booster and components associated with the brake booster such as the accumulator.

SUMMARY OF THE INVENTION

A primary object of the present invention is to provide a hydraulic supply system with a regulator which meters the flow of supply hydraulic fluid from a pump supplied to a brake booster to define maximum fluid pressure for assisting in effecting a brake application by directing the flow of supply hydraulic fluid directly to a steering gear once the maximum fluid pressure develops.

In more particular detail, the hydraulic supply system has a regulator with a first housing with a bore therein having a pump inlet connected to receive supply hydraulic fluid, a pump outlet connected to communicated supply hydraulic fluid to an inlet port of the booster, a gear inlet connected to a gear port of the booster, and a gear outlet port connected to the steering gear. The brake booster having a second housing with a control chamber therein connected to a first bore and a second bore. A piston located in the first bore is connected to a master cylinder while a control valve is located in the second bore. The second bore having a supply inlet port for receiving supply hydraulic fluid from the pump outlet of the regulator, the gear port and a return port connected to a reservoir of the pump. Linkage responsive to an input member moves the control valve in the second bore to initially terminate communication between the second bore and reservoir by way of the return port and thereafter moves to restrict the flow of the supply hydraulic fluid presented to supply inlet port by flowing a first portion supply hydraulic fluid to the control chamber while directing the flow of a second portion of the supply hydraulic fluid to the steering gear. The first portion of the supply hydraulic fluid acts on the piston to provide a master cylinder with an operational force to produce a brake application in the wheels of a vehicle. A reserve chamber is connected to the supply inlet port and the control chamber for receiving the supply hydraulic fluid to establish a reserve hydraulic fluid supply. The control valve responds to a desired brake application applied to the linkage by the input member by communicating the reserve hydraulic fluid supply to the control chamber in an absence of supply hydraulic fluid to effect a corresponding brake application. The pump inlet of the regulator receives the supply hydraulic fluid and a spool in bore of the first housing directs the flow of the supply hydraulic fluid through the pump outlet to the inlet port of the housing of the booster. The regulator is responsive to a preset hydraulic fluid pressure that develops in the first portion of the supply hydraulic fluid and is presented to the chamber by metering the flow of the supply hydraulic fluid to the supply inlet port of the brake booster and directly communicating the supply hydraulic fluid to the steering gear. The regulator on metering the flow of the supply hydraulic fluid to the booster supply inlet port establishes a maximum limit for the hydraulic pressure in the first portion of the supply hydraulic fluid as presented to the control chamber and reserve chamber.

An advantage of the hydraulic supply system resides in a regulator which limits the development of the fluid pressure presented to a brake booster and accumulator to a preset value below the capacity of a supply pump.

A further advantage of the hydraulic supply system is provided by a regulator wherein supply fluid delivered by a pump supply fluid to a brake system and steering gear bypasses the brake system when a fluid pressure develops that exceeds a preset value to make a greater quantity of flow available to the steering gear.

A still further advantage of the hydraulic supply system is provided by a regulator which protects a brake booster from a hydraulic fluid pressure above a preset value that is supplied to a steering system from a common pump.

DETAILED DESCRIPTION

Figure 1:
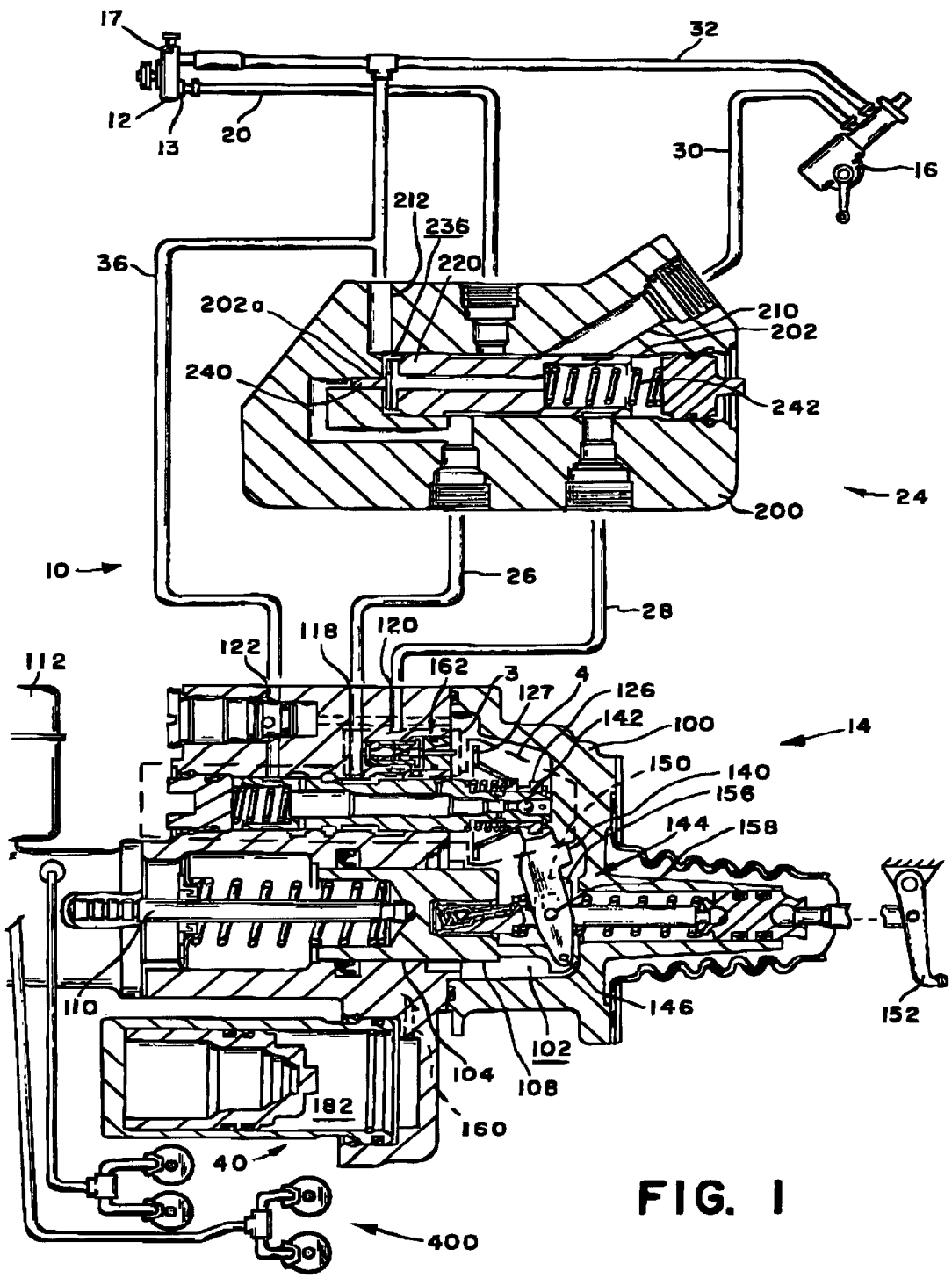
FIG. 1 is a schematically illustration a hydraulic supply system for a brake system and a steering system having a pressure regulator made according to the principals of the present invention wherein the flow of hydraulic fluid is sequentially supplied to the brake booster and a steering gear.

The hydraulic system 10 shown in FIG. 1 includes a pump 12 which is powered by the engine of a vehicle for sequentially supplying a brake booster 14 with supply hydraulic fluid to assist in effecting a brake application and a steering gear 16 with supply hydraulic fluid to assist in a steering application. The pump 12 operates as a closed circuit with hydraulic fluid continuously flowing from pump outlet 13 to reservoir 17 by way of a conduit 20 which connects pump 12 with a regulator 24, a conduit 26 which connects the regulator 24 with brake booster 14, a conduit 28 which connects the brake booster 14 with the regulator 24, a conduit 30 which connects the regulator 24 with the steering gear 16 and a conduit 32 which connects the steering gear 16 with the reservoir 17. In addition, the brake booster 14 is connected to the reservoir 17 by conduit 36 to provide a return flow path for supply hydraulic fluid utilized in effecting a brake application and the regulator 24 is connected to the return conduit 36 to provide a return for any supply fluid that may bleed past the components therein. A desired fluid pressure for providing a power assist for the steering gear 16 may be greater than that for the brake booster 14 and to eliminate or prevent the brake booster 14 from being subject to stress that could damage components therein, the regulator 24 functions to protect the brake booster 14 components and associated accumulator 40 by defining a maximum limit of the fluid pressure that is presented to the brake booster 14 by diverting or by-passing supply hydraulic fluid directly to the steering gear 16 once a preset maximum fluid pressure develops in the supply hydraulic fluid presented to the brake booster 14.

Figure 4:
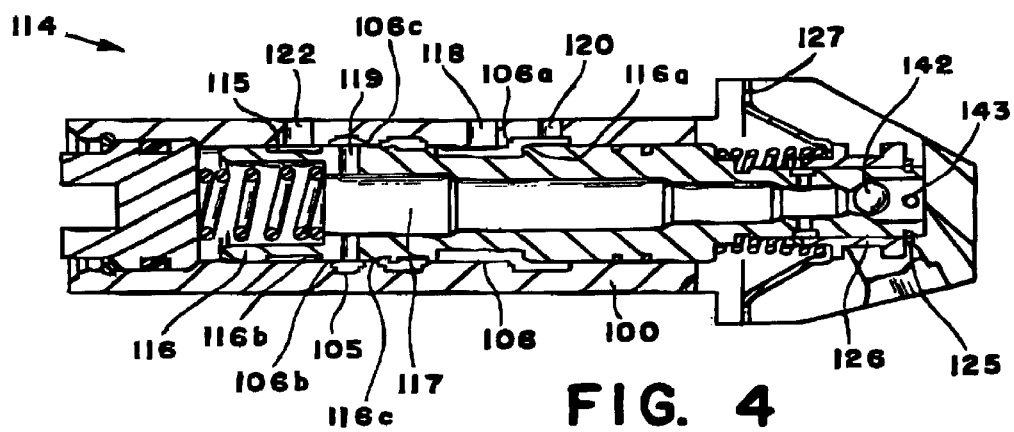
FIG. 4 is an enlarged view of the control valve of FIG. 1.

In more particular detail the brake booster 14 is of a type disclosed in U.S. Pat. No. 4,281,585 wherein a housing 100 has a control chamber 102 therein connected to a first bore 104 and a second bore 106. A piston 108 located in the first bore 104 is connected to a corresponding piston in a master cylinder 112 by an output push rod 110 while a control valve 114 is located in the second bore 106. The control valve 114, as best shown in FIG. 4, includes a spool 116 which moves to control the flow of supply hydraulic fluid between an inlet port 118, a return port 122 and an outlet port 120. The inlet port 118 is connected to regulator 24 for receiving supply hydraulic fluid from pump 12 while the outlet port 120 is connected to regulator 24 for communicating supply hydraulic fluid from the brake booster 14 to the regulator 24 and the return port 122 provides a flow path to reservoir 17 from the control chamber 102 for hydraulic fluid on termination of a brake application. Spool 116 is moved in bore 106 in response to an operator input applied to brake pedal 152 to restrict the flow of supply hydraulic fluid between land 106a on housing 100 and land 116a on spool 116 and build pressure in the supply hydraulic fluid present at inlet port 118. Initial movement of spool 116 brings land 116b into contact with land 106b in bore 106 to close communication between passage 117 located in the axial center of spool 116 and return port 122 through radial passage 119 and groove 115. The fluid pressure in the supply hydraulic fluid continues to build as land 116a moves toward land 106a and at the same time a flow path develops between inlet port 118 and passage 117 as land 116c moves past the edge 106c of groove 105a such that pressurized hydraulic fluid is now communicated to control chamber 102 by flowing past ball 142 retained in spool 116 by pin 143.

Input movement of spool 116 is achieved by linkage 144 which connects a lever 140 with brake pedal 152. Lever 140 has nibs or projections thereon (not shown) that are pivotally connected to a sleeve 126 which is retained on spool 116 by snap ring 125 and pivotally connected to piston 108 by a pin 146. In addition, buttons or projections 158 (only one is shown) on lever 140 ride in slots 150 (only one is shown) located of a yoke 156 arrangement to provide for independent movement of both piston 108 and spool 116.

Inlet port 118 of housing 100 is connected with a reserve chamber 182 of accumulator 40 for storing supply hydraulic fluid by passage 159, bore 166 and passage 160. A fill and relief valve 162 is located in passage 160 to control the flow of supply hydraulic fluid from inlet port 118 to the reserve chamber 182.

Figure 3:
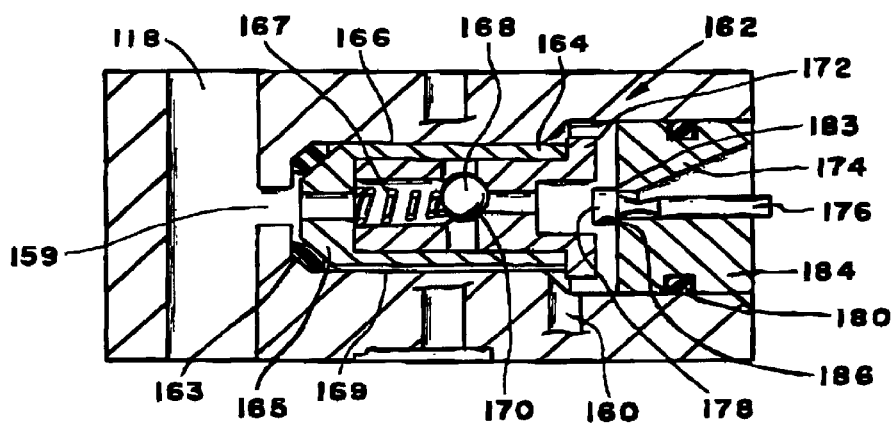
FIG. 3 is an enlarged view of the fill and dump valve of FIG. 1.

The fill and relief valve 162, as best shown in FIG. 3, has a cylindrical body 164 which is aligned bore 166 of housing 100. The fill and relief valve 162 has a ball 168 located in the cylindrical body 164 which is urged by spring 167 toward a seat 170 in end cap 172 attached to the cylindrical body 164. The fill and relief valve 162 is retained in bore 166 by a dump valve 174 which is resiliently sealed in bore 166 by seal 180.

Dump valve 174, as best shown in FIG. 3, includes a stem or pin 176 which has a head 178 with a sealing face 183 thereon which mates with seat 186 on end cap 184. The fluid pressure in passage 160 acts on head 178 to urge sealing face 183 against seat 186 to provide a seal for passage with respect to control chamber 102.

Figure 2:
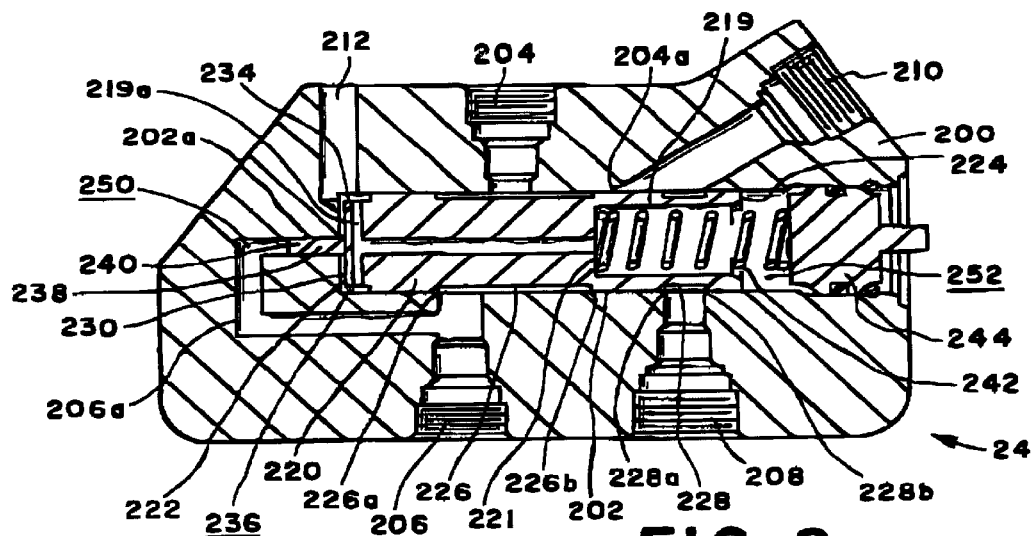
FIG. 2 is an enlarged view of the regulator FIG. 1.

The regulator 24, as best shown in FIG. 2, includes a housing 200 with a bore 202 therein. Bore 202 has an inlet port 204 connected to receive supply hydraulic fluid from pump 12 by way of conduit 20, an outlet port 206 connected to communicated supply hydraulic fluid to inlet 118 in housing 100 of brake booster 14 by way of conduit 26, an inlet port 208 connected to receive supply hydraulic fluid from outlet 120 of the brake booster 14 by way of conduit 28, an outlet port 210 connected to communicate supply hydraulic fluid to steering gear 16 by way of conduit 30, and a return port 212 connect to provide a flow path to reservoir 17 by way of conduit 36. A cylindrical spool 220 located in bore 202 has a first end 222 and a second end 224 with a first peripheral groove 226 separated from a second peripheral groove 228 and wall 230 located adjacent the first end 222. A peripheral surface 234 on cylindrical spool 220 adjacent the first end 222 has a smaller diameter than the remainder of cylindrical spool 220 and with housing 200 defines a first return chamber 236 in the bottom of bore 202. A spring 242 located between end cap 244 and a shoulder 221 in bore 219 urges cylindrical spool 220 toward the first return chamber 236 to define a second chamber 252 within bore 202. The second return chamber 252 is connected the first return chamber 236 by way of axial bore 219 and cross bore 219a. Cylindrical spool 220 engages a pin 238 that is located a small diameter extension 202a of bore 202. Extension 202a is connected to outlet port 206 by passage 206a and communicates the fluid pressure in supply hydraulic fluid present at outlet 206 to act on end 240 of pin 238. Spring 242 in urging the first end 222 of cylindrical spool 220 toward the first return chamber 236 initially positions land 226a of the first peripheral groove 226 in edge alignment outlet port 206 and land 228a of groove 228 in edge alignment with inlet port 208. In this situation, supply hydraulic fluid freely flows from inlet port 204 to outlet port 210 by way of brake booster 14 until a fluid pressure in the supply hydraulic fluid acts on the effective area of end 240 of pin 238 to overcome spring 242 to move cylindrical spool 220 toward the second return chamber 252 and begin metering the flow of supply hydraulic fluid to inlet port 118 of brake booster 14 and directly diverting a second portion of the supply hydraulic fluid to the steering gear 16 by way of groove 226 and a flow path created between land 204a in bore and land 226b on cylindrical spool 220 to outlet port 210.

Mode of Operation

Pump 12 operates from power supplied by a belt driven by a rotating shaft of an engine for supplying fluid flow to a hydraulic circuit 10 in a manner as illustrated in FIG. 1. Hydraulic fluid flows in a continuous path from outlet 13 of pump 12 and back to reservoir 17 in the following flow path: from pump outlet 13 through conduit 20 to regulator 24, from regulator 24 through conduit 26 to brake booster 14, from brake booster 14 through conduit 28 back to regulator 24, from regulator 24 through conduit 30 to steering gear 16 and from steering gear 16 through conduit 32 to reservoir 17. The flow of supply hydraulic fluid under this situation is essentially unrestricted as neither the brake booster 14 not the steering gear 16 places a demand for assistance on the hydraulic supply fluid.

When an operator desires to effect a brake application, an input force applied to brake pedal 152 is communicated through linkage 144 to the brake booster 14. Lever 140 initially responds to an input force by moving spool 116 to the left, as viewed in FIG. 1, to bring land 116a toward land 106a and begin restricting the flow of supply hydraulic fluid to outlet port 120. At the same time, land 116b on spool 116 engages land 106b on housing 100 to close communication between bore 106 and return port 122. When spool 116 has moved a sufficient distance to move land 116c past land 106c, a flow path is opened between inlet or pressure port 118 and axial passage 117 in spool 116 by way of radial passage 119 and groove 105 in housing 100 such that a first portion of the supply hydraulic fluid is communicated to chamber 102 with a desired operational fluid pressure corresponding to the input force applied to brake pedal 152. The operational fluid pressure in chamber 102 acts on piston 108 to develop a force which moves piston 108 in bore 104 and correspondingly provides a piston in master cylinder 112 with a braking force to pressurize fluid therein. The pressurized fluid from the master cylinder 112 is thereafter supplied to effect a brake application in wheels 400. As the fluid pressure in the supply hydraulic fluid is develops by restricting the flow of fluid between lands 106a and 116a, that portion of the supply hydraulic fluid which flows past land 106a to outlet port 120 is communication to steering gear 16 by way of conduit 28 to inlet port 208 in regulator 24 through groove 228 to outlet port 210 in regulator 24 and from outlet port 210 through conduit 30 to steering gear 16 before returning to reservoir 17 by conduit 32.

The supply hydraulic fluid present at inlet port 118 of booster 14 is also communicated to reserve chamber 182 in accumulator 40 by way of passage 159, bore 166 and passage 160. The fluid pressure in the supply hydraulic fluid present in passage 159 acts on the cylindrical body 164 of the fill and relief valve 162 to move end 165 away from seat 163 and allow supply hydraulic fluid to flow in a passage or flow path 169 created between the peripheral surface of cylindrical body 164 and bore 166 to passage 160. Thus, the same fluid pressure developed in the operation of brake booster 14 and supplied to operational chamber 102 is communicated to reserve chamber 182 in accumulator 40. The fluid pressure present in bore 166 also acts on head 178 of pin 176 of dump valve 174 to urge face 183 toward seat 186 to segregate passage 160 from chamber 102.

The volume of flow of the supply hydraulic fluid across lands 106a and 116a decreases as the force demand for operating the brake booster 14 increases such the second portion of the supply hydraulic fluid communicated from outlet or gear port 120 for operating the steering gear continually decreases. The fluid pressure in the operating supply hydraulic fluid present at inlet port 118 is communicated to passage 206a to a regulator chamber 250 in regulator 24 for acting on the end 240 of pin 238 and developing a force which after overcomes spring 242 and moves spool 220 in bore 202 toward the second return chamber 252 to cause metering of the supply hydraulic fluid through outlet port 206 and initiate the flow of a portion of the supply hydraulic fluid from inlet port 204 to outlet or gear port 210 by way of groove 226 and a flow path defined between land 204a in housing 200 and land 226b on cylindrical spool 220 to place the regulator 24 in a metering mode. With the regulator 24 in a metering mode, the flow of supply hydraulic fluid to the brake booster 24 decreases and correspondingly the flow of the second portion of the supply hydraulic fluid from outlet or gear port 120 to inlet port 208 in the regulator 24 also decreases. As the flow of the second portion of the supply hydraulic fluid decreases, the pressure differential across spool 220 between regulator chamber 250 and return chamber 236 increases to a point where a force acting on pin 238 moves cylindrical spool 220 to a metering position corresponding to an input force applied to pedal 152. When a maximum desired braking force is required, the metering flow of supply fluid through the regulator 24 from inlet port 204 to outlet port 206 is nearly terminated and as a maximum fluid pressure is achieved through the restriction of the flow across or between lands 106a and 116a as land 106a engages land 116a. This limitation on the development of fluid pressure for operating in the brake booster 14 also limits the fluid pressure of the reserve hydraulic fluid stored in chamber 182 of accumulator 40. However, the flow of supply hydraulic fluid from pump 12 continues and a demand for assist in the operation of the steering gear 16 is met by the direct flow of supply hydraulic fluid from inlet port 204 to outlet port 210 by way of groove 226 as land 226b has moved a sufficient distance from land 204a to provide for unrestricted flow. In this situation, should a fluid pressure demand for operating the steering gear 16 be larger than the preset maximum fluid pressure of the brake booster 14, such larger fluid pressure is not communicated to the brake booster 14 since lands 226a and 228a on cylindrical spool 220 will have moved past edges of outlet port 206 and 208. Thus, the flow of supply hydraulic fluid in hydraulic system 10 supplied by pump 12 is designed to meet and protect a lower pressure requirement of a brake booster 14 from a higher pressure requirement of a steering gear 16.

On termination of an input force on pedal 152, linkage 140 moves spool 116 to again fully open communication between inlet port 118 and outlet port 120 as land 116c moves past land 106c to allow communication from chamber 102 to reservoir 17 by way of return port 122, groove 115, passage 119, and passage 117.

In an event, that the flow of hydraulic fluid from pump 12 is unavailable, an input force applied to pedal 152 is communicated to lever 140 which moves spool 116 to initially close communication through passage 117 to bore 106 while at the same time bring hat 127 on sleeve 126 into engagement with pin 176 on dump valve 174. Movement of pin 176 correspondingly moves sealing surface 183 away from seat 186 to allow stored hydraulic fluid present in chamber 182 to flow into chamber 102 and develop a force to effect a corresponding brake application by the movement of piston 108. Usually accumulator 40 is designed to provide about 4–6 brake applications before needing to recharged by the action of the restriction of flow through the brake booster 14.

We claim:
1. In a hydraulic system having a pump for sequentially supplying a brake booster with supply hydraulic fluid to assist in effecting a brake application and supplying a steering system with supply hydraulic fluid to assist in a steering application, said brake booster having a housing with a control chamber connected to a first bore with a piston therein and a second bore with a control valve therein, said piston being connected to a master cylinder, said second bore having an inlet port connected to said pump for receiving supply hydraulic fluid, an outlet port connected to the steering gear and a return port connected to a reservoir of said pump, linkage means responsive to an input member for moving said control valve to initially terminate communication between said second bore and said reservoir by way of said return port and thereafter restricting the flow of said supply hydraulic fluid presented to said inlet port by flowing a first portion to said control chamber while directing the flow of a second portion of said supply hydraulic fluid to said steering gear, said first portion of said supply hydraulic fluid acting said piston to provide a master cylinder with an operational force to produce a brake application in wheels of a vehicle, said hydraulic system being characterized by regulator means connected to said pump for receiving and directing the flow of said supply hydraulic fluid to said inlet port of said housing of said booster, said regulator means responding to a preset hydraulic fluid pressure in said first portion of said supply hydraulic fluid presented to said chamber by metering the flow of said supply hydraulic fluid to said inlet port of said brake booster and thereafter directly communicating a corresponding portion of said supply hydraulic fluid to said steering gear, said regulator means on metering the flow of said supply hydraulic fluid to said inlet port establishing a maximum limit for the hydraulic pressure in said first portion of said supply hydraulic fluid as presented to said control chamber.

2. The hydraulic system as recited in claim 1 wherein said regulator means is characterized by a housing having a third bore therein with a pump inlet connected to receive said supply hydraulic fluid, a pump outlet connected to communicate said supply hydraulic fluid to said inlet port of said booster, a gear inlet connected to receive said second portion of said supply hydraulic fluid from said outlet port of said booster and a gear outlet port through which said steering gear receives supply hydraulic fluid.

3. The hydraulic system as recited in claim 2 wherein said regulator means is further characterized by cylindrical spool located in said third bore for selective controlling the flow of said supply hydraulic fluid to said booster and said steering gear as a function of the fluid pressure of said first portion of said supply hydraulic fluid.

4. The hydraulic system as recited in claim 3 wherein said regulator means is further characterized by a regulator chamber connected to receive said pump outlet.

5. The hydraulic system as recited in claim 4 wherein said cylindrical spool is further characterized by a first surface being connected to said regulator chamber and a second surface being connected to said gear inlet, said fluid pressure in said first portion of said supply hydraulic fluid and in said second portion of said supply hydraulic fluid creating a pressure differential which causes said cylindrical spool to move and meter the flow said supply hydraulic fluid through said pump outlet.

6. The hydraulic system as recited in claim 5 wherein said regulator means is further characterized by spring means located in said third bore and acting on said cylindrical spool to establish a minimum pressure differential before said cylindrical spool moves to meter the flow of said supply hydraulic fluid through said pump outlet.

7. The hydraulic system as recited in claim 6 wherein said hydraulic system is characterized by said cylindrical spool nearly interrupts the flow of said supply hydraulic fluid through said pump outlet when a desired steering assist corresponding to a fluid pressure is greater than said maximum fluid pressure in said first portion of said supply hydraulic fluid.

8. The hydraulic system as recited in claim 1 further including a reserve chamber connected to said inlet port and said control chamber for receiving said supply hydraulic fluid to establish a reserve hydraulic fluid supply, said control valve being responsive to a desired brake application applied to said linkage means by said input member for communicating said reserve hydraulic fluid supply to said control chamber in an absence of supply hydraulic fluid to effect a corresponding brake application.

9. The hydraulic system as recited in claim 8 wherein said regulator protects said reserve chamber from receiving fluid pressure above said maximum limit for said first portion of said supply hydraulic fluid.

10. The hydraulic system as recited in claim 1 wherein said regulator protects said brake booster from receiving fluid pressure above said maximum limit developed during an assist of said steering gear.

\* \* \* \* \*